Figure 1:
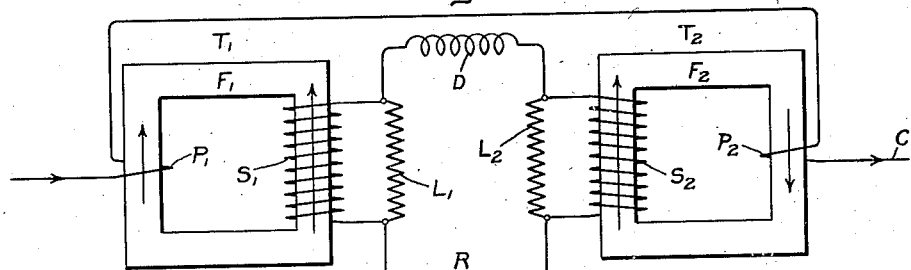

April 29, 1930.    J. W. McNAIRY    1,756,924
UNIDIRECTIONAL ELECTRICAL INDUCTIVE APPARATUS AND SYSTEM
Filed Feb. 18, 1926    2 Sheets-Sheet 1

Inventor:
Jacob W. McNairy,
by *Alexander S. Lenz*
His Attorney.

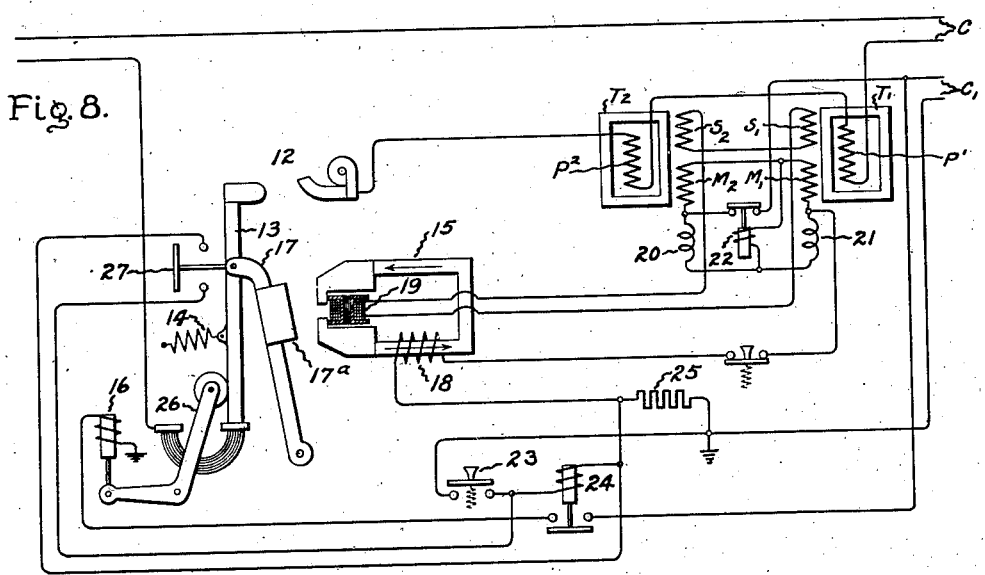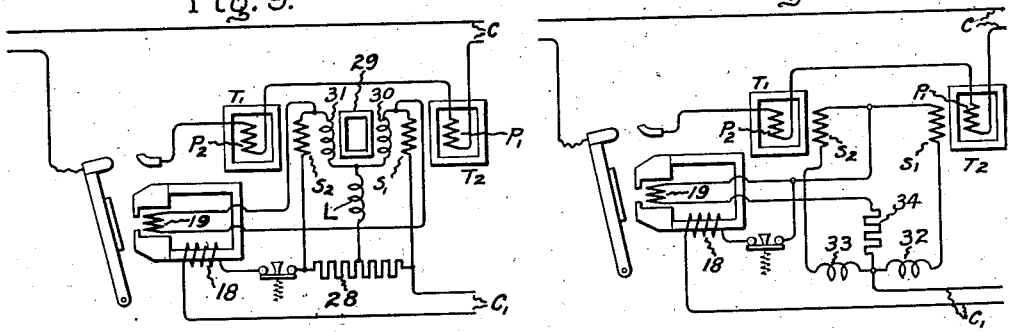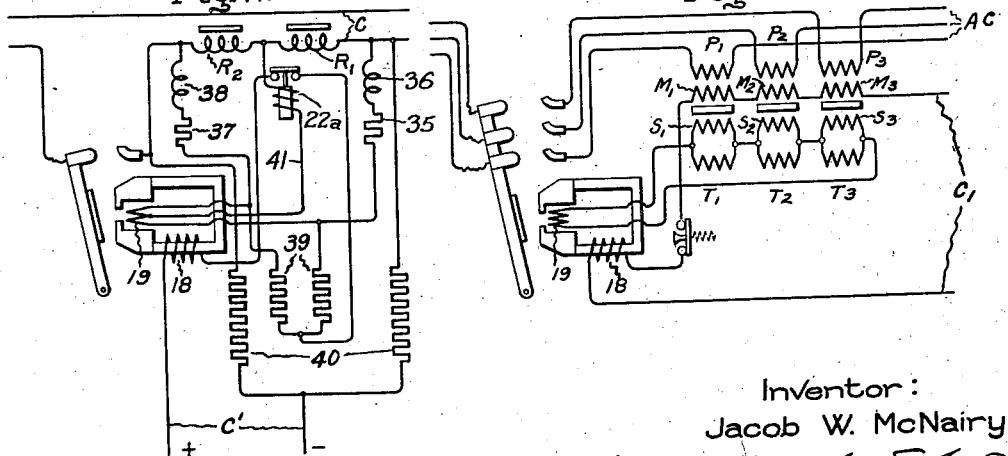
Inventor:
Jacob W. McNairy,
by
His Attorney.

Patented Apr. 29, 1930

1,756,924

UNITED STATES PATENT OFFICE

JACOB W. McNAIRY, OF SCHENECTADY, NEW YORK, ASSIGNOR TO GENERAL ELECTRIC COMPANY, A CORPORATION OF NEW YORK

UNIDIRECTIONAL ELECTRICAL INDUCTIVE APPARATUS AND SYSTEM

Application filed February 18, 1926. Serial No. 89,247.

This invention relates to a method and means for energizing electroresponsive devices or circuits with unidirectional current and the improvements provided by the present invention enable an electroresponsive device or an electric circuit to be energized through the agency of inductive apparatus such as transformers, reactors, or the like, with a unidirectional current or voltage irrespective of the direction in which energizing current or voltage is supplied to the inductive apparatus.

Furthermore, by means of the present invention the unidirectional energization of the electroresponsive device or local circuit may be caused to occur only in response to predetermined conditions in the energizing circuit of the inductive apparatus, as, for example, an abnormal increase in the voltage or current.

Thus, although not necessarily limited thereto, the unidirectional inductive arrangement provided by the present invention may be employed advantageously to operate electroresponsive apparatus requiring energizing current or voltage in a predetermined direction, such as circuit interrupters, relays, vacuum tubes, or the like, in response to the sudden occurrence of an overload current flow or excessive voltage in alternating current circuits or in continuous circuits where the flow of energy may be reversed.

The invention may be carried into effect with various arrangements of the magnetic structure of the inductive apparatus, and with the windings interconnected in various ways in the energizing circuit and the local circuit in which the unidirectional current or voltage is to be induced. In carrying the invention into effect in a preferred form I provide the inductive device with suitable windings for interlinking the energizing circuit and the local circuit through a plurality of magnetic flux paths. The windings are so connected and the magnetic flux paths are so arranged that under normal conditions the inductive couplings between the two circuits substantially neutralize each other and no appreciable current is induced in the local circuit. However, the arrangement is such that upon a predetermined increase in the current flowing in either direction in the energizing circuit the rate of change of magnetization of one portion of the flux paths exceeds that of another portion of the flux paths. Preferably this is accomplished by initially magnetizing the flux paths to suitable values, and arranging the coupling with the energizing circuit in such manner that the energizing current tends to decrease the magnetization of one portion of the flux paths and at the same time increase the magnetization of the remaining flux paths. In case the initial magnetization of the flux paths is sufficient to almost saturate the flux paths, the superimposed differential magnetization due to the increase of current in the energizing circuit produces a rapid reduction in the value of the flux in one portion of the flux paths without materially increasing the value of the flux in the remaining paths. This results in a predominating current being induced always in a predetermined direction in the local circuit by the interlinkage with the portion of the flux paths having the rapid decrease in magnetization irrespective of the direction of current increase in the energizing circuit. With the proper constants, the value of the current induced in the local circuit may be made to correspond to the rate of change of effective value of an alternating current. The induced current which always flows in the same direction may serve to energize any desired form of unidirectional electroresponsive device connected in the local circuit. Furthermore, where the current induced in the local circuit is in accordance with the rate of change of effective value of an alternating current in the energizing circuit, a discriminating action of the electroresponsive device may be obtained, that is, the device may be arranged to respond only when the rate of change of effective value of the alternating current exceeds a predetermined value.

Although of general application, my unidirectional inductive arrangement is particularly advantageous when embodied in a quick acting circuit interrupter of the type described and broadly claimed in the Reissue Patent No. 15,441 to John F. Tritle, dated August 29, 1922. In the Tritle type of circuit interrupter the movable circuit interrupting member is strongly biased to the circuit interrupting position and is held electromagnetically in the closed position. The release of the circuit interrupting member is effected by a magnetizing winding or current conductor which is arranged to supply a unidirectional magnetization of such polarity as to decrease the holding effect of the flux of the holding electromagnet instantly upon a flow of current of predetermined value through the releasing winding or conductor in a predetermined direction.

By means of my present invention the releasing winding or current conductor of an electric circuit interrupter of the Tritle type may be supplied with unidirectional energizing current responsively to predetermined electrical conditions such as a rapid increase of current flow in an alternating current circuit, or to be more precise, a rapid increase in the effective value of the alternating current. Thus the magnetizing action of the releasing winding or conductor always is of the predetermined polarity required to effect release of the movable circuit interrupting member irrespective of the direction in which the increased current flow occurs in the alternating circuit. Likewise, in what I shall term "reversible" continuous current circuits where the flow of current may be in either direction as in railway regenerative braking systems or other similar service my invention enables a circuit interrupter of the Tritle type to afford protection against excessive overload currents in either direction. Also by means of the present invention, an alternating current circuit interrupter of the Tritle type may be made to operate responsively to a predetermined rate of change of effective value of the alternating current.

In the accompanying drawing I have illustrated several forms of my invention. Fig. 1 shows diagrammatically an inductive device embodying a simplified form of the invention for the purpose of explaining the principles thereof; Figs. 2, 3, 4, 5 and 6 are intended to illustrate diagrammatically the magnetic and electrical phenomena occurring during different phases of operation of the inductive device shown in Fig. 1; Figs. 7, 8, 9, 10, 11 and 12 illustrate different forms of the invention embodied in systems employing high speed circuit interrupters of the previously mentioned Tritle type.

Referring to Fig. 1, it will be seen that the simplified inductive arrangement comprises essentially the two transformers $T_1$, $T_2$, each having respectively the magnetic flux paths $F_1$, $F_2$, through which the primary or inducing windings $P_1$, $P_2$, are inductively coupled with the corresponding secondary or induced windings $S_1$, $S_2$. The flux paths $F_1$, $F_2$, are normally magnetized in the direction indicated by the arrows associated with the secondary windings $S_1$, $S_2$, by supplying direct current to the secondary windings from the power source indicated as + and − in the drawing. As shown, the resistance R is connected across the direct current supply lines in which the stabilizing reactance 10 and resistance 11 preferably are included, and the secondary windings $S_1$, $S_2$, are connected in a local circuit including the winding D of an electroresponsive device so as to be energized by the voltage drop across the resistance R. The winding D represents an electroresponsive device which it is desired to energize always in a predetermined direction responsively to a predetermined variation in the current in an energizing circuit C including the primary windings $P_1$, $P_2$, and irrespective of the direction of current flow therein. The transformers $T_1$, $T_2$, conveniently may be of the type ordinarily employed as current transformers for energizing ammeters, wattmeters, or other measuring instruments in alternating current service, although other suitable types of transformers may be employed.

In case the energizing circuit for the primary windings $P_1$, $P_2$, is to be supplied with alternating current, the secondary windings $S_1$, $S_2$, preferably are loaded upon suitably proportioned loading resistors or reactors $L_1$, $L_2$, respectively, in order to prevent material variation of the direct current magnetization of the flux paths $F_1$, $F_2$, under normal current conditions in the alternating current circuit. If the primary windings $P_1$, $P_2$, are connected in a continuous current energizing circuit in which the current flow may be increased in either direction, the loading resistors $L_1$, $L_2$, may be omitted, and suitable air gaps may be located in the flux paths to increase the value of the energizing current required to reverse the normal magnetization of the flux paths, if desired.

It will be observed that, as shown in Fig. 1, the primary windings $P_1$, $P_2$, are differentially connected in the energizing circuit C so that the magnetizing force of the windings tends to increase the flux set up in one of the flux paths by the normal direct current magnetizations and reduce the value of the flux set up by the direct current magnetization in the other flux path upon a flow of current in the energizing circuit in either direction. The induced or secondary windings $S_1$, $S_2$, are inductively interlinked with the flux paths $F_1$, $F_2$, and as previously mentioned, are connected in a local circuit to supply an energizing current to the winding D of an electroresponsive device which requires a unidirectional energization or magnetization to effect operation thereof. In the arrangement shown in Fig. 1 the windings $S_1$, $S_2$, are connected differentially or in opposition so that the voltages induced in these windings upon oppositely varying the magnetization of the respective flux paths with which the windings are associated tend to oppose each other. However, as will be pointed out hereinafter, a cumulative arrangement of the windings $S_1$, $S_2$, may be employed if desired. In either case the inductive couplings between the energizing circuit and the local circuit through the two flux paths are arranged to neutralize each other and thereby prevent operation of the electroresponsive device under normal current conditions in the energizing circuit.

Without intending to be bound by the theory advanced, I offer the following as an explanation of the operation of the unidirectional transformer arrangement shown in Fig. 1.

Figure 2:
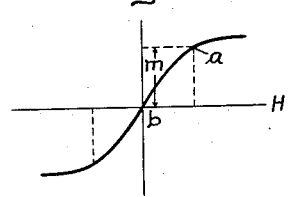
Figure 3:
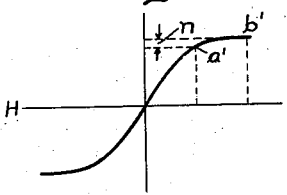

Assume that the secondary windings $S_1$, $S_2$, are energized with a direct current from the source $+$ and $-$ sufficient to magnetize the two flux paths $F_1$, $F_2$, to the values $a$ and $a'$ indicated in the magnetization curves of the respective flux paths shown in Figs. 2 and 3, and that the primary windings $P_1$, $P_2$, are suddenly energized with an excessive value of either direct current or alternating current. Under these conditions a current flow of appreciable value is induced in the local circuit including the secondary windings $S_1$, $S_2$, and the winding D of the electroresponsive device. The induced current always flows through the winding D in a predetermined direction, irrespective of the relative direction in which the excessive current flows in the energizing circuit C.

Let us assume that the excessive value of direct current or alternating current in the energizing circuit C momentarily flows through the primary windings $P_1$, $P_2$, in the direction indicated by the arrows in Fig. 1. Under the assumed conditions the magnetomotive force of the winding $P_1$ is in opposition to the normal magnetization of the flux path $F_1$ supplied from the source $+$ and $-$ and the magnetomotive force of the winding $P_2$ is in the same direction as the normal direct current magnetizing force supplied from the same source. If the current through the winding $P_1$ rises to a sufficiently large value, the flux in the flux path $F_1$ may be decreased by the value $m$ so that the value of the flux in path $F_1$ is reduced to substantially zero. At the same time, the flux in the path $F_2$ is increased only a slight amount, as indicated by $n$ in Fig. 3 due to the substantially saturated condition of the flux path $F_2$ by the normal direct current magnetization. Since the rate of change of flux in the path $F_1$ is materially greater than the rate of change of flux in the path $F_2$, as readily may be observed by drawing tangents to the curves between the points $a$, $b$ and $a'$, $b'$, the current induced in the respective windings $S_1$, $S_2$, is dependent upon the rate of change of flux in the path with which each winding is interlinked. Under the assumed conditions the voltage induced in the winding $S_1$ is of materially greater value than the voltage induced in the secondary winding $S_2$ due to the relatively high saturation of the flux path $F_2$ and the resulting large current flow in the winding $S_1$ produces a voltage drop in the loading resistor $L_1$ which causes an appreciable current to flow through the winding D while the flux is decreasing in the path $F_1$. With the characteristics of the inductive arrangement properly proportioned the current supplied the winding D is substantially in accordance with the rate of change of effective value of the current in the energizing circuit. The current flowing through the winding D also flows through the secondary winding $S_2$ and the current flow is in such direction that the magnetomotive force of windings $S_2$ tends to further increase the saturation of path $F_2$.

As the energizing current of the windings $P_1$, $P_2$, is decreased to zero the induced current in the winding $S_1$ likewise decreases and becomes zero when the magnetomotive force of winding $P_1$ is just sufficient to neutralize the normal magnetizing effects of the direct current energization of winding $S_1$. This is due to the fact that the normal direct current magnetization of the flux path is opposed by a magnetization which may be considered as a differential between the magnetizing effects of the energizing current in winding $P_1$ and the induced current in winding $S_1$.

Figure 4:
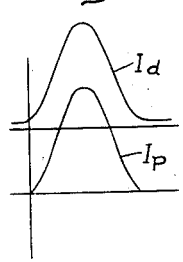

The simultaneous reduction in the energization of winding $P_2$ permits the value of the flux in the path $F_2$ to return substantially to its initial value. Due to the relatively small flux change in the path $F_2$ the winding $S_2$ remains practically inactive. The inductive phenomena just described is illustrated in Fig. 4, in which the curve $I_p$ indicates the varying values of current flowing through the primary windings $P_1$, $P_2$, and the curve $I_d$ indicates the unidirectional current impulse supplied to the winding D under the assumed conditions. The value of the normal magnetizing current supplied from the source $+$ and $-$ and flowing through the winding D is indicated at each end of the curve $I_d$.

In case the current in the energizing circuit of the windings $P_1$, $P_2$, should flow in the reverse direction from that assumed in the previous description, the magnetizing force of the winding $P_2$ then opposes the normal magnetization of the flux path $F_2$, while the magnetizing force of the winding $P_1$ tends to increase the saturation of path $F_1$. In this case the predominating voltage which causes the flow of current through winding D is induced in the secondary winding $S_2$, while the secondary winding $S_1$ remains substantially inactive. It should be noted that the resulting current flows in the winding $S_2$ in such direction as to produce a voltage drop across the loading resistor $L_2$ so that the winding D is supplied with a current impulse $I_d$ as shown in Fig. 4 in the same direction as when the secondary winding $S_1$ predominates. The inductive action is substantially the same as previously described except that the magnetization of flux path $F_2$, instead of the flux path $F_1$, is reduced in value. Hence, it will be seen that irrespective of the direction of current increase in the energizing circuit in which the windings $P_1$, $P_2$, are connected, unidirectional energizing current is always supplied to the winding D.

It will be observed that when the windings $P_1$, $P_2$, are energized with current flowing in either direction the initial value of flux in one or the other of the flux paths $F_1$, $F_2$, is thereby decreased. Consequently, the algebraic sum of the initial fluxes in the two flux paths is always reduced and the unidirectional current impulse supplied to the winding D is induced by the resulting decrease in the total flux in the flux paths. As the value of the induced current impulse is dependent upon the amount of the reduction in the total flux it will be evident that if the energizing current of the primary windings $P_1$, $P_2$, is of sufficiently large value, the magnetization of one or the other of the flux paths actually may be reversed, that is, carried below the zero value, as described above. Under these conditions the rate of change of the effective value of the energizing current is increased and a unidirectional current impulse of proportionately greater value is supplied to the winding D.

Figure 5:
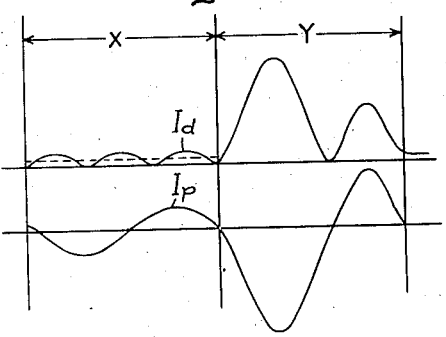
Figure 6:
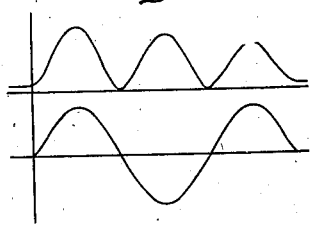

When in alternating current service it is desired that the winding D remain unenergized under normal conditions of alternating current flow in the energizing circuit C and be supplied with energizing current only upon a sudden increase of the current to an abnormal value, this may be accomplished by properly proportioning the loading resistors $L_1$, $L_2$, so that the current supplied to the loading resistors by the secondary windings $S_1$, $S_2$, under normal conditions is sufficient to prevent any appreciable reduction in the value of the flux in the corresponding flux paths $F_1$, $F_2$, by the current flowing through the primary winding $P_1$, $P_2$. Under these conditions the magnetization of one or the other of the flux paths is reduced only when the effective value of the alternating current in the energizing circuit C rapidly increases and one or the other of the secondary windings $S_1$, $S_2$, serves to induce a unidirectional current impulse in the local circuit, including the winding D, responsively to the rate of change of effective value of the energizing current as previously described. The portion X of the curve shown in Fig. 5 graphically represents the action of the inductive device when the energizing circuit C, including the primary windings $P_1$, $P_2$, is energized with alternating current of normal value, the curve $I_p$ representing the alternating current and the curve $I_d$ representing the slight fluctuations in the normal magnetizing current of the secondary windings $S_1$, $S_2$, from the supply source + and −, which also flows through the winding D. The portion Y of the curve shown in Fig. 5 represents the inductive action of the transformers $T_1$, $T_2$, upon a sudden increase in the effective value of the alternation current flowing in the energizing circuit C where the current is interrupted after the increase to the abnormal value. It will be observed that the current $I_d$ is increased to a relatively high value during the first half cycle of the abnormal increase of the alternating current $I_p$ in the energizing circuit C and is again increased during the next succeeding half cycle of the alternating current $I_p$. The length of time that the unidirectional current flows in the local circuit including the winding D may be measured by the number of cycles of the alternating current and is dependent upon the relative resistance and inductance of the windings $S_1$, $S_2$, and D, which are included in the local circuit, as well as the value of the initial unidirectional current impulse induced in the local circuit. With a highly inductive circuit of low resistance, the pulsating flow of unidirectional current in the local circuit will continue for several cycles as shown more clearly in Fig. 6.

While I have described the operation of the transformer arrangement shown in Fig. 1 upon the assumption that the primary windings $P_1$ and $P_2$ are energized with alternating current, substantially the same phenomena occurs when the primary windings are connected in a continuous current circuit in which the direction of current flow may be reversed. Upon a rapid increase of the continuous current the voltage induced in one or the other of the secondary windings $S_1$, $S_2$, predominates depending upon the direction in which the continuous current flows through the primary windings $P_1$ and $P_2$. The current supplied from the secondary windings, however, is always in the same direction. In this case the secondary current is not pulsating in character as previously described but rapidly increases to a maximum value and then decreases as the energy is dissipated in the resistance in the secondary circuit in a manner similar to that shown in Fig. 4.

Figure 7:
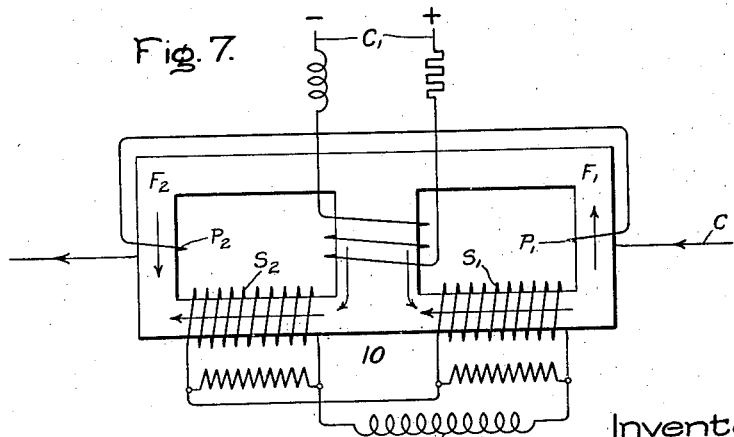

While the inductive arrangement shown in Fig. 1 employs two transformers $T_1$, $T_2$, having separate magnetic flux paths, the flux paths may be combined into a single magnetic structure 10, such as shown in Fig. 7, if desired. Furthermore, a separate magnetizing winding M may be employed for normally magnetizing the flux paths from the supply source + − if desired. The primary windings $P_1$, $P_2$, and the secondary windings $S_1$, $S_2$, are interlinked with the flux paths $F_1$, $F_2$, and connected respectively in the energizing circuit C and the local circuit, including the winding D in substantially the same manner as described in connection with Fig. 1. With the relation between the initial magnetization of each flux path $F_1$, $F_2$, and the inductive coupling of the primary circuit C, and the local circuit, including winding D, as described in connection with Fig. 1, it will be evident that the same inductive phenomena as described in connection with magnetization curves shown in Figs. 2 and 3 causes a unidirectional current to be induced in the local circuit, including the winding D, upon a predetermined increase in the current flowing in either direction in the energizing circuit C.

With the foregoing explanation in mind the embodiment of my invention in the circuit interrupter shown in Fig. 8 may be readily understood. The interrupter 12 is illustrated diagrammatically as a single pole air break switch having a magnetic arc blowout but for high voltage multi-phase alternating current circuits it will be understood that an interrupter of the multiple pole oil break type provided with suitable arc suppressing chambers, preferably is employed. As shown, the interrupter is of the high speed flux shifting type fully described and broadly claimed in the previously mentioned Tritle Reissue Patent No. 15,441, and comprises essentially the circuit controlling member 13 which is strongly biased to the circuit opening position of the spring 14 and is arranged to be held in the circuit closing position by the holding electro-magnet 15 when operated thereto by the electrically operated closing mechanism 16. The circuit controlling member 13 is pivotally mounted upon the rotatable arm 17 and is arranged to trip free when an excessive current flows in the circuit controlled by the interrupter as is more fully described and claimed in Tritle Patent No. 1,560,440, issued November 3, 1925.

The winding 18 of the holding electromagnet 15 is normally energized from a suitable unidirectional source of current indicated as the supply lines C. When normally energized winding 18 supplies a unidirectional flux of sufficient value to hold magnetic member $17^a$ carried by the rotatable arm 17 in engagement with the poles of electromagnet 15 against the opposing strain of the biasing spring 14 and thus maintain the circuit controlling member 13 in the circuit closing position. As set forth in the above Tritle reissue patent, and as more fully described in Patent No. 1,506,483, issued August 26, 1924 to Leonhard Haag, a winding or current conductor 19 is associated with the holding electromagnet 15 for diverting the holding flux from the magnetic member $17^a$ to permit the circuit interrupter to open in accordance with its bias. With the winding 18 energized to set up a unidirectional holding flux in the electromagnet 15 in the direction indicated by the arrows in the drawing, the interrupter is opened only when the releasing winding 19 is energized with current in a predetermined direction so as to supply magnetization of the proper polarity to release the magnetic member $17^a$. When the releasing winding 19 is energized with current in the reverse direction, the member $17^a$ is held more firmly in engagement with the holding electromagnet 15 and thus maintains the circuit interrupter closed.

The interrupter 12 controls the circuit of the power lines C which may carry either alternating current or direct current in which the direction of flow may be reversed.

In accordance with my present invention the unidirectional energizing current for the local circuit including the releasing winding 19 is supplied by means of an inductive arrangement quite similar to that shown in Fig. 1. In this case, however, the arrangement comprises two cooperating transformers $T_1$ and $T_2$ having independent magnetic circuits upon which the primary windings $P_1$ and $P_2$, the secondary windings $S_1$ and $S_2$ and the separate magnetizing windings $M_1$ and $M_2$ respectively are disposed. The primary or inducing windings $P_1$ and $P_2$ are connected in the circuit including the power line C which is controlled by the interrupter 12 and the secondary windings $S_1$ and $S_2$ are connected differentially to the interrupter releasing winding 19. The magnetizing windings $M_1$ and $M_2$ conveniently may be energized in series circuit with the interrupter holding winding 18 from the unidirectional supply lines $C_1$ as indicated in Fig. 8. In order to maintain the flux variations in the transformers $T_1$ and $T_2$ under normal load conditions at a negligible value or within desired limits as described in connection with Fig. 1, the magnetizing windings $M_1$ and $M_2$ are shunted through the inductive resistances 20 and 21 respectively and the operating winding of the electroresponsive relay 22. It will be evident that the same result is obtained as by loading the secondary windings $S_1$, $S_2$, in the manner shown in Fig. 1.

With the alternating current power lines C and the constant current supply lines $C_1$ energized from suitable sources the operation of the interrupter is as follows: The push button 23 is closed to energize the relay 24 in parallel circuit with the current limited resistor 25 which is inserted in the holding coil circuit. Upon the resulting closure of relay 24 the operating winding of the closing mechanism 16 is energized and the closing mechanism moves the pivotally mounted bell crank 26 to operate the movable circuit controlling member 13 towards the closing position. When the magnetic member 17ª engages with the poles of the electromagnet 15, the operating winding of relay 24 is short circuited by the auxiliary contact 27 and the relay opens to deenergize the closing mechanism thereby permitting the spring 14 to rotate the member 13 about its pivotal support on the rotatable member 17 to the circuit closing position. In this way the biasing spring 14 serves not only to bias the contact arm 13 together with the rotatable arm 17 to the circuit opening position, but also functions to insure operation of the contact arm 13 to the circuit closing position after the closing electromagnet 16 is deenergized and the bell crank 26 of the closing mechanism disengages with the lower end of the contact arm 13. This construction is more fully described and claimed in the Tritle Patent No. 1,560,440 of November 3, 1925, and permits the circuit interrupter to trip free in case a heavy overload current flows upon closure of the contactor. The flux of the normally energized holding winding 18 temporarily is increased when the resistor 25 is shunted by the operating of winding relay 24 and is further increased when the relay 24 is short circuited by the auxiliary contact 27. This feature is fully described and claimed in the copending patent application Serial No. 6,204, filed February 2, 1925, by John F. Tritle and myself and serves to maintain the magnetic member 17ª in the attractive position during the closure of the interrupter.

When the current flowing in the alternating current power lines C upon the closure of the interrupter 12 is of normal value, the transformers $T_1$ and $T_2$ are arranged so that the currents induced in the secondary windings $S_1$ and $S_2$ effectively neutralize each other and there is no appreciable energizing current supplied to the releasing winding 19. However, if the effective value of the alternating current should suddenly increase the current induced in one or the other of secondary windings $S_1$ and $S_2$ predominates and supplies an energizing current to the releasing winding 19 in the predetermined direction required to shift the flux of the holding electromagnet 15 from the magnetic member 17ª and thereby permit the spring 14 to rapidly operate the interrupter to the open position. The manner in which this is accomplished is substantially the same as described in connection with Fig. 1, and hence need not be repeated in detail. In case the increase of alternating current occurs gradually, the current supplied by the secondary windings $S_1$ and $S_2$, being substantially in accordance with the rate of change of effective value of the alternating circuit, may be of insufficient value to effect the release of the interrupter. However, under these conditions the circulating current in the operating winding of relay 22 becomes sufficient to operate the relay and open the energizing circuit of the holding winding 18. In this way the magnetic member 17ª is released to permit the circuit interrupter to open upon a gradually increasing overload.

If desired the simplified unidirectional inductive transformer arrangements diagrammatically illustrated in Figs. 9 and 10 may be employed. In each of these arrangements the separate magnetizing windings are omitted and the unidirectional magnetization of the transformer is obtained by passing the magnetizing current directly through the secondary windings $S_1$ and $S_2$.

As shown in Fig. 9, the primary windings $P_1$, $P_2$, of the transformers $T_1$, $T_2$, are connected in the circuit controlled by the interrupter in substantially the same manner as described in connection with Fig. 8. The induced or secondary windings $S_1$, $S_2$, are supplied directly with magnetizing current by the voltage drop across the resistor 28 which is connected to be energized in series circuit with the interrupter holding winding 18 from the continuous current supply source $C_1$. The polarity of the direct current magnetization of the transformers $T_1$, $T_2$, is such that the currents induced in the secondary windings $S_1$, $S_2$, upon flow of current in either direction through the primary windings $P_1$, $P_2$, tends to increase the magnetization of one of the transformers and decrease the magnetization of the other transformer. The secondary windings $S_1$, $S_2$, are connected to the reactor 29 having the windings 30 and 31, and the mid point between the windings 30 and 31 is connected to the mid point of the resistor 28 preferably through a loading reactor L on the winding of an over-load relay such as shown in Fig. 8. The induced, or secondary windings $S_1$, $S_2$, are connected differentially or in opposition so that under normal load conditions in the circuit controlled by the interrupter the current induced in winding $S_1$, flows through the reactor winding 30 and the mid connection to the resistor 28, while the current induced in winding $S_2$ flows through the reactor winding 31 and the mid connection to the resistor.

Under these conditions the energization of the reactor windings 30 and 31 is such that the magnetizing effects upon the reactor core are neutralized. Consequently, each of the secondary windings $S_1$, $S_2$, is effectively loaded upon the reactor L and there is no appreciable current flow through the interrupter tripping winding 19 under normal conditions in the energizing circuit C.

With the secondary windings $S_1$, $S_2$, and the resistor 28 properly designed, the direct current passing through the secondary windings is sufficient to magnetize the transformers $T_1$, $T_2$, to suitable values such as shown at the points $a$ and $a'$ in the saturation curves of Figs. 2 and 3.

When the interrupter controls an alternating current circuit and a heavy overload or short circuit current suddenly flows in the power circuit controlled by the interrupter the current flowing in the primary windings $P_1$, $P_2$, is rapidly increased. This serves to induce a predominating current in one or the other of the secondary windings $S_1$, $S_2$, depending upon the point in the alternating current wave at which the heavy overload or short circuit occurs. Under these conditions the secondary winding in which the predominating current is induced tends to send the predominating current through the corresponding winding of the reactor. As the predominating current is not neutralized by the current in the other winding the reactor affords a very large reactance. Under these conditions a large reactive voltage is built up across the reactor winding carrying the predominating current. This voltage is impressed upon the tripping winding 19 of the interrupter and is always in the direction required to effect release of the interrupter. The inductive phenomena whereby the predominating current is induced in one of the secondary windings is substantially the same as that described in detail in connection with Fig. 1, and hence will be readily perceived without further detailed description. The differential arrangement of the reactor serves to amplify the energizing voltage for the tripping winding 19 of the interrupter produced by the predominating flow of current through one or the other of the secondary windings.

In the arrangement shown in Fig. 10 the induced or secondary windings $S_1$, $S_2$, of the transformers $T_1$, $T_2$ are connected cumulatively in a closed circuit including the loading reactors 32 and 33. The local circuit including the resistance 34 and the tripping winding 19 of the interrupter is connected to the closed circuit with one lead between the secondary windings $S_1$, $S_2$, and the other lead between the reactors 32 and 33. With this arrangement the unidirectional magnetizing of the transformers $T_1$, $T_2$, may be accomplished by supplying currents from the direct current supply line $C_1$ to the same points of the closed circuit to which the tripping winding 19 is connected, the magnetizing current passing through the holding winding 18 of the interrupter.

With the connections as described, the direct current flowing through the holding winding 18 passes through the secondary windings $S_1$, $S_2$, in parallel circuit and in such direction that the initial magnetization of transformer $T_1$ is varied oppositely from that of transformer $T_2$ by the current flowing through the primary windings $P_1$, $P_2$, which are connected in series in the circuit controlled by the interrupter as shown in Fig. 8.

With the cumulative connection of the secondary windings $S_1$, $S_2$, the reactors 32 and 33 are so proportioned that under normal conditions of current flowing in the alternating current circuit controlled by the interrupter the currents induced in the respective secondary windings $S_1$, $S_2$, are neutralized by being dissipated in the winding and the reactor associated therewith.

However, when the current in the alternating current circuit rapidly increases to an abnormal value, one or the other of the secondary windings $S_1$, $S_2$, produces a predominating voltage and the resulting current flow in the local circuit is always in the predetermined direction required to energize the tripping winding 19 and permit the interrupter to open.

As previously pointed out in connection with Fig. 1, the predominating voltage is induced in the secondary winding associated with the flux path in which the magnetization is initially decreased at the instant of the rapid increase of current in the circuit controlled by the interrupter. Substantially the same magnetic phenomena as described in connection with the flux paths $F_1$ and $F_2$ of Fig. 1 occurs in the transformers $T_1$, $T_2$, and causes the unidirectional energizing current for the tripping winding 19 to be produced upon a rapid increase in the current flow in either direction in the primary windings $P_1$, $P_2$.

In the arrangements illustrated in Fig. 11, the unidirectional energizing current for the tripping winding of the circuit interrupter is supplied from the reactors $R_1$ and $R_2$. As shown, these reactors are connected in the power circuit controlled by the interrupter which, as previously pointed out, may carry either alternating current or direct current which may increase in value in either direction. The local circuit comprising the tripping winding 19 of the circuit interrupter is substantially the same as described in connection with Figs. 8, 9, and 10, except that a tap is brought out at the middle point of the winding, which is connected through the operating winding of the overload relay $22^a$ to the supply line between the reactors $R_1$, $R_2$. One end of the tripping winding 19 is connected preferably through the resistance 35 and the reactance 36 to the outside end of reactor $R_1$ and the other end of the tripping winding is likewise connected through the resistance 37 and the reactance 38 to the outside end of reactor $R_2$.

Direct current for energizing the holding winding 18 of the interrupter and also for normally magnetizing the reactors $R_1$, $R_2$, to a suitable value is supplied from the direct current supply lines $C_1$, the reactors $R_1$, $R_2$, being energized in parallel in the direct current circuit through the pairs of resistors 39 and 40, and connected so that the reactors are magnetized differentially with respect to the magnetizing effect of the current in the power line C. The magnetizing circuit of reactor $R_1$ may be traced from the positive supply line $C_1$, through the holding winding 18, the right hand resistor 39, the lower half of the tripping winding 19, thence through the mid connection 41, the reactor $R_1$, and the right hand resistor 40 to the negative supply line $C_1$. The magnetizing circuit of the reactor $R_1$ extends through the holding winding 18, the left hand resistor 34, the upper half of the tripping winding 19, the conductor 41, the reactor $R_2$, and the left hand resistor 40, to the negative supply line $C_1$.

When the current in the power line C suddenly increases in either direction, the magnetization of the reactors $R_1$, $R_2$, is oppositely varied, one being increased, while the other is decreased. For the reasons previously pointed out, the rate of change of flux in the particular reactor in which the magnetization is decreased is greater than in the other reactor, and hence, the induced voltage across the particular reactor predominates over the voltage of the other reactor. Consequently, unidirectional energizing current for the tripping winding 19 is supplied by the reactor having the predominating voltage. Furthermore, the predominating voltage is always in the predetermined direction required to effect release of the interrupter. It is believed that without further detailed explanation it will be seen that the inductive phenomena of the reactor arrangement shown in Fig. 7 is quite similar to that of the transformer arrangement of Fig. 1, although the former arrangement possibly is more simple and desirable. In case the power current increases more slowly to an abnormal value the overload relay $22^a$ serves to interrupt the energizing circuit of the holding winding 18 and thus permit the interrupter to open the circuit.

The invention may be carried into effect to protect three phase alternating current circuits in the manner schematically shown in Fig. 12. In this arrangement the three transformers $T_1$, $T_2$, $T_3$, have respectively the primary windings $P_1$, $P_2$, $P_3$, each connected in one of the alternating current supply lines AC, the secondary windings $S_1$, $S_2$, $S_3$, connected in series circuit with the tripping winding 19 of the interrupter, and the magnetizing windings $M_1$, $M_2$, $M_3$, connected in series circuit with the holding winding 18 of the interrupter. While I have shown the separate transformers $T_1$, $T_2$, $T_3$, it will be understood, however, that these transformers may be consolidated into a unitary structure if desired as the invention is not necessarily limited to the use of separate transformers. The arrangement of the windings of the several transformers illustrated in Fig. 12 is such that when direct current is supplied to the magnetizing windings $M_1$, $M_2$, $M_3$, from the direct current supply line $C_1$, and a three phase alternating current is flowing in the supply lines C, the unidirectional magnetization of one of the transformers $T_1$, $T_2$, $T_3$, is decreasing while the magnetization of the other two transformers is increasing, or vice versa. Under these conditions, and with a proper value of current flowing through the magnetizing windings the voltages induced in the secondary windings $S_1$, $S_2$, $S_3$ under normal conditions of current flow in the alternating current circuit effectively neutralize each other. There is no appreciable current supplied to the tripping winding 19. However, when the alternating current rapidly increases in value the portion of the secondary windings of the transformers in which the flux is decreasing induces a predominating voltage which is always in the predetermined direction required to supply the tripping winding 19 with current to open the interrupter. In this case the inductive phenomena whereby the transformers function to supply unidirectional energizing current to the tripping winding 19 is substantially the same as that described in connection with Fig. 1, with the exception that the magnetization of two of the transformers corresponds to that of one of the flux paths $F_1$ and $F_2$ shown in Fig. 1. However, under any condition of rapid rise of current in the polyphase alternating current circuit C the transformers cooperate to supply a substantially unidirectional current to the tripping winding 17.

While I have described several specific embodiments of my invention in order to explain the principles thereof, I would have it understood that the invention is not necessarily limited to the apparatus shown and may be carried out by other means.

What I claim as new and desire to secure by Letters Patent of the United States, is,—

1. An inductive device comprising magnetic means having a plurality of normally magnetized magnetic flux paths, an energizing circuit and a local circuit inductively interlinked through each of said plurality of normally magnetized magnetic flux paths with the relation between the initial magnetizaiton of each flux path and the inductive coupling of the circuits therewith such that a unidirectional current is induced in the local circuit upon a predetermined flow of current in either direction in the energizing circuit.

2. An inductive device comprising magnetic means having a plurality of magnetic flux paths, an energizing circuit and a local circuit inductively interlinked through each of said plurality of magnetic flux paths with the inductive couplings normally arranged to neutralize each other, and means for initially magnetizing the flux paths to render a portion of the normally neutralized inductive couplings effective to induce a current always flowing in the same direction in the local circuit upon a predetermined flow of current in either direction in the energizing circuit.

3. An inductive device comprising normally magnetized magnetic means having a plurality of flux paths, and windings inductively coupled through the said flux paths with a circuit arranged to be energized with current that varies both in value and direction of flow, the said windings being interconnected with each other to induce a current always flowing in the same direction in a local circuit in response to a predetermined variation in the value of the current in said energizing circuit and irrespective of its direction of flow.

4. An inductive device comprising magnetic means having a plurality of flux paths, an energizing circuit and a local circuit interlinked with each of said flux paths with the inductive couplings between the circuits normally arranged to neutralize each other, and means for magnetizing the flux paths to render either portion of the normally neutralized inductive couplings relatively ineffective upon a predetermined flow of current in the energizing circuit depending upon the direction of current flow and thereby permit the other portion of the inductive couplings to induce a predominating current always flowing in a predetermined direction in the local circuit.

5. An inductive device comprising magnetic means having a plurality of flux paths, an energizing circuit and a local circuit inductively interlinked with each of said flux paths, and means for controlling the magnetization of said flux paths to render the rate of change of magnetization of a portion of the flux paths greater than the rate of change of magnetization of the remaining portion of the flux paths upon a predetermined variation in an energizing current flowing in either direction in the energizing circuit and thereby induce a unidirectional current in the local circuit.

6. An inductive device comprising magnetic means having a plurality of flux paths, inducing windings connected in an energizing circuit to be energized with current which varies both in value and direction of flow, induced windings connected in a local circuit, said inducing and induced windings inductively interlinking said flux paths to differentially couple the energizing circuit with the local circuit, means associated with said windings for preventing appreciable change in the magnetization of said flux paths when the current in the said energizing circuit is below a predetermined value, and means for substantially saturating the flux paths to insure an appreciable change in the magnetization of a portion of the flux paths upon a rapid increase of current in the energizing circuit above said predetermined value with the current flow in either direction and thereby induce a unidirectional current in the local circuit.

7. The combination with a main circuit and a second circuit, of means for interconnecting the said circuits providing for the setting up by the main circuit of a plurality of opposing forces which act electrically on the second circuit and which normally neutralize each other while conditions of current flow in the main circuit are normal, and means for controlling the balance between said forces to effect a flow of current in the second circuit in response to an abnormal flow of current in the main circuit.

8. The combination with an energizing circuit and a local circuit, of means for connecting the said circuits, the said means having a plurality of magnetic paths for the flux set up in response to current in the energizing circuit, and means for controlling the flux in said paths to induce a flow of current in the local circuit always in one direction in response to a predetermined flow of current in the energizing circuit in either direction.

9. The combination with an energizing circuit and a local circuit, of inductive means for connecting the said circuits, the said means having a plurality of magnetic paths for the flux set up in response to current in said energizing circuit, and means for storing magnetic energy in the said flux paths to induce a unidirectional current flow in the said local circuit in response to a variation of current in the energizing circuit.

10. The combination with an energizing circuit and a local circuit, of inductive means comprising a plurality of flux paths for interlinking the two circuits through a plurality of inductive couplings arranged to neutralize each other, said flux paths having magnetization characteristics such that upon a predetermined variation of current flowing in either direction in the energizing circuit the rate of change of magnetization of a portion of the flux paths exceeds the rate of change of magnetization of the remaining portion of the flux paths and thereby induces a current always flowing in the same direction in the local circuit.

11. The combination with an energizing circuit and a local circuit, of inductive means having a plurality of flux paths and a plurality of windings associated therewith for interlinking the two circuits through a plurality of inductive couplings arranged to neutralize each other, and means for magnetizing said flux paths to induce a unidirectional current in the local circuit upon a predetermined variation of the current flowing in either direction in the energizing circuit.

12. In combination, an electric circuit arranged to be energized with current that varies both in value and direction of flow, a local circuit, inductive means having a plurality of magnetic flux paths and a plurality of inducing and induced windings disposed thereupon with the inducing portion of the windings energized in accordance with the current in the electric circuit and the induced portion of the windings connected to energize the local circuit, and means for controlling the magnetization of said magnetic flux paths to cause the rate of change of magnetization of a portion of the flux paths to exceed the rate of change of magnetization of the remaining portion of the flux paths upon a predetermined variation of the current flowing in either direction in the energizing circuit and thereby induce a unidirectional current in the local circuit.

13. The combination with an energizing circuit and a local circuit, of inductive means interlinking the two circuits, said means having a plurality of magnetic flux paths and a plurality of windings cooperating therewith to interlink the two circuits differentially through said flux paths, and means for magnetizing the said magnetic flux paths to render the rate of change of magnetization of a portion of the flux paths greater than the rate of change of magnetization of the remaining portion of the flux paths upon a variation of the current flowing in either direction in the energizing circuit and thereby induce a flow of current in a predetermined direction in the local circuit.

14. The combination with an alternating current circuit and a local circuit, of inductive means having a plurality of magnetic flux paths and a plurality of windings associated therewith for interconnecting the two circuits through a plurality of inductive couplings, means associated with said windings for preventing appreciable change in the magnetization of said flux paths when the current in the alternating current circuit is below a predetermined value, and means for substantially saturating the flux paths to induce a unidirectional current in the local circuit upon a rapid increase of the alternating current above said predetermined value.

15. The method of inducing a unidirectional current in a circuit which consists in inductively interlinking the circuit with each of a plurality of normally magnetized magnetic flux paths and superimposing a variable magnetization upon said flux paths to decrease the value of flux in one portion of the flux paths without materially altering the value of the flux in the remaining paths.

16. The method of inducing a unidirectional current in a circuit which consists in inductively interlinking the circuit with each of a plurality of normally magnetized magnetic flux paths with each inductive interlinking arranged to induce a flow of current in the circuit in the same direction upon a reduction in the magnetization of the corresponding flux path, and superimposing a differential magnetization upon said flux paths to decrease the value of flux in a portion of the flux paths without materially altering the value of the flux in the remaining paths.

17. The method of inducing a unidirectional current in a circuit which consists in inductively interlinking the circuit with each of a plurality of normally magnetized magnetic flux paths with each inductive interlinking arranged to induce a flow of current in the circuit in the same direction upon a reduction in magnetization of the corresponding flux path, and superimposing equal and opposite magnetizing forces upon different portions of said flux paths to substantially saturate one portion of the flux paths while reducing the value of the flux in the remaining paths.

18. The method of establishing a unidirectional inductive coupling between two circuits comprising inductively interlinking the first circuit with the second circuit through a plurality of normally magnetized magnetic flux paths arranged to be differentially magnetized in accordance with the same current flowing in either direction in said first circuit.

19. The method of establishing a unidirectional inductive coupling between two circuits comprising successively interlinking the first circuit with the second circuit through a plurality of substantially saturated magnetic flux paths arranged to be differentially magnetized upon current flow in either direction in said first circuit.

20. The method of establishing a unidirectional inductive coupling between two circuits comprising interlinking the first circuit with the second circuit through a plurality of inductive couplings arranged in series relation, providing magnetic flux paths for the inductive couplings arranged to be differentially magnetized upon current flow in either direction in said first circuit, and substantially saturating the flux paths with unidirectional flux.

21. The method of establishing a unidirectional inductive coupling between two circuits comprising inductively interlinking the first circuit with a plurality of substantially saturated magnetic flux paths and successively interlinking the second circuit with the flux paths so as to decrease the value of the flux in a portion of the flux paths without materially altering the value of the flux in the remaining paths upon current flow in either direction in said second circuit.

22. The method of establishing a unidirectional inductive coupling between a local circuit and an alternating current circuit comprising inductively interlinking the local circuit with the alternating current circuit through a plurality of magnetic flux paths arranged to be differentially magnetized in accordance with the same current flowing in either direction in the alternating current circuit and substantially saturating the flux paths with unidirectional flux.

23. The combination with an electric circuit and an electrical device operable in response to current flow in a predetermined direction, of means inductively connecting the electric circuit and the electrical device, and arranged to induce current in said predetermined direction for operating the device upon a rapid increase of current in the electric circuit in either direction.

24. The combination with an electric circuit and an electrical device operable in response to current flow in a predetermined direction, of means inductively connecting the electric circuit and the electroresponsive device through a plurality of inductive couplings arranged to neutralize under normal conditions in the electric circuit and to induce current in said predetermined direction for operating the electrical device upon an abnormal increase of current in the electrical circuit in either direction.

25. The combination with an electric circuit and an electrical device operable in response to current flow in a predetermined direction, of inductive means inductively connecting the electrical circuit and the electroresponsive device through a plurality of flux paths and having a plurality of induced windings associated with the flux paths and arranged to neutralize each other under normal conditions of current flow in the electric circuit, and means for magnetizing the flux path to cause a current in the predetermined direction for operating the electroresponsive device to be induced in said windings upon an abormal increase of current flow in the electric circuit in either direction.

26. The combination with an electric circuit arranged to be energized with current that varies both in value and direction of flow, and an electromagnetic device having a winding for supplying magnetization of a predetermined polarity for operating the device, of inductive means for inductively coupling the winding with the electric circuit and arranged to induce current for energizing the winding to supply magnetization of the polarity required to operate the device upon a rapid increase of current in the electric circuit in either direction.

27. The combination with an electric circuit arranged to be energized with current that varies both in value and direction of flow and an electromagnetic device operable in response to magnetization of a predetermined polarity, of means including a magnetizing winding inductively coupled through each of a plurality of normally magnetized flux paths with the electric circuit with the initial magnetization of each flux path and the inductive coupling therethrough such that the winding is energized to supply magnetization of the polarity required to operate the device upon a rapid increase of current in either direction in the electric circuit.

28. The combination with an electric circuit arranged to be energized with current that varies both in value and direction of flow, and an electromagnetic device operating in response to magnetization of a predetermined polarity, of means including a magnetizing winding inductively coupled through each of a plurality of flux paths with the electric circuit with the inductive couplings arranged to neutralize each other under normal conditions of current flow in the electric circuit and means for magnetizing said flux paths to render a corresponding portion of the inductive couplings effective to energize the magnetizing winding for supplying magnetization of the required polarity to operate said device upon a rapid increase of current in either direction in the electric circuit.

29. The combination with an electric circuit and an electromagnetic device having a winding for supplying magnetization of predetermined polarity for operating the device, of inductive means having a plurality of flux paths for connecting the winding with the electric circuit through a plurality of inductive couplings arranged to differentially energize the winding and thereby render the winding ineffective under normal conditions of current flow in the electric circuit, and means for magnetizing the flux paths to render one portion of the differential inductive couplings inactive and thereby permit the remaining portion of the inductive couplings to energize the windings for supplying magnetization of the polarity required to operate the device upon a rapid increase of the current in the electric circuit in each direction.

30. The combination with an alternating current circuit and an electroresponsive device, of means inductively connecting the alternating current circuit and the electroresponsive device through a plurality of inductive couplings arranged to neutralize under normal conditions in the alternating current circuit and to supply energizing current to the electroresponsive device in accordance with the rate of increase of the effective value of the alternating current.

31. The combination with an alternating current circuit and an electroresponsive device operable in response to predetermined current flow, of inductive means inductively connecting the alternating current circuit and the electroresponsive device through a plurality of flux paths having a plurality of induced windings associated with the flux paths arranged to neutralize each other under normal conditions of current flow in the alternating current circuit, and means for magnetizing the flux paths to cause an operating current of said predetermined value to be induced in said windings upon an increase in the effective value of the alternating current above a predetermined rate.

In witness whereof, I have hereunto set my hand this 17th day of February, 1926.

JACOB W. McNAIRY.